US006916261B2

(12) United States Patent
Cullen et al.

(10) Patent No.: US 6,916,261 B2
(45) Date of Patent: Jul. 12, 2005

(54) COMPOSITE BAMBOO SPORTING IMPLEMENT

(76) Inventors: Stephen M. Cullen, 14601 Sandy Ridge Rd., Silver Spring, MD (US) 20905; Zhan Wang, No. 16 North Jinhua Road, Xi'an (CN) 710032

( * ) Notice: Subject to any disclaimer, the term of this patent is extended or adjusted under 35 U.S.C. 154(b) by 0 days.

(21) Appl. No.: 10/677,685

(22) Filed: Oct. 3, 2003

(65) Prior Publication Data

US 2005/0075201 A1 Apr. 7, 2005

(51) Int. Cl.⁷ ............................................. A63B 59/14
(52) U.S. Cl. ...................................... 473/563; 473/566
(58) Field of Search ............................... 473/560–568, 473/547, 319, 320, 519, 520, 457

(56) References Cited

U.S. PATENT DOCUMENTS

| | | | | |
|---|---|---|---|---|
| 1,450,646 A | * | 4/1923 | Sadenwater | 473/564 |
| 1,601,915 A | * | 10/1926 | Hillerich | 473/564 |
| 3,150,032 A | * | 9/1964 | Rubenstein | 428/313.7 |
| 4,010,884 A | | 3/1977 | Rothman | |
| 4,070,019 A | * | 1/1978 | Segal et al. | 473/536 |
| 4,148,482 A | | 4/1979 | Harwell, Jr. et al. | |
| 4,572,508 A | * | 2/1986 | You | 473/520 |
| 4,591,155 A | | 5/1986 | Adachi | |
| 4,689,257 A | * | 8/1987 | Baum | 428/106 |
| 5,476,706 A | * | 12/1995 | Shimizu | 428/136 |
| 5,490,669 A | * | 2/1996 | Smart | 473/564 |
| 5,496,027 A | | 3/1996 | Christian et al. | |
| 5,558,728 A | | 9/1996 | Kobayashi et al. | |
| 5,620,179 A | * | 4/1997 | MacKay, Jr. | 473/564 |
| 5,866,272 A | | 2/1999 | Westre et al. | |
| 5,906,550 A | * | 5/1999 | Kingston | 473/320 |
| 5,933,703 A | | 8/1999 | Robertson | |
| 5,939,213 A | | 8/1999 | Bowden et al. | |
| 5,951,800 A | | 9/1999 | Pettit | |
| 6,007,440 A | * | 12/1999 | Bender et al. | 473/564 |
| 6,042,493 A | | 3/2000 | Chauvin et al. | |
| 6,114,050 A | | 9/2000 | Westre et al. | |
| 6,265,064 B1 | | 7/2001 | Mori | |
| 2003/0127199 A1 | * | 7/2003 | Lou | 160/236 |

(Continued)

FOREIGN PATENT DOCUMENTS

CA          1099761          4/1982

(Continued)

OTHER PUBLICATIONS http://manipur.nic.in/indgames.htm, starting at subtitle, "Khong Kangjei (Manipuri Hockey)".

*Primary Examiner*—Mark S. Graham
(74) *Attorney, Agent, or Firm*—Donald J. Lecher, P.C.

(57) ABSTRACT

A composite laminate bamboo sporting implement with an elongated handle having multiple layers of bamboo and an impact portion having multiple laminate layers affixed to the elongated handle suitable to strike, carry or throw a sporting object. Each of the elongated handle bamboo layers has an average thickness of 1.0 to 3.0 mm and both the handle and impact portion alternates in grain direction between adjoining bamboo layers at an angle between 30 to 90 degrees. Bamboo layers may be treated with a hydrogen peroxide solution to remove impurities and excess moisture thereby reducing the weight and maintaining the strength of the at least one impact portion bamboo layer. Additionally, at least one internal impact portion layer has at least a portion of aircraft-grade titanium alloy for strengthening the impact portion.

40 Claims, 3 Drawing Sheets

U.S. PATENT DOCUMENTS

2004/0029660 A1 * 2/2004 Chen et al. .................. 473/564

FOREIGN PATENT DOCUMENTS

| | | |
|---|---|---|
| CA | 1138912 | 1/1983 |
| CA | 1150331 | 7/1983 |
| CA | 1151693 | 8/1983 |
| CA | 1183883 | 3/1985 |
| CA | 1206309 | 6/1986 |
| CA | 1233738 | 3/1988 |
| CA | 2037273 | 2/1991 |
| CA | 2062635 | 3/1992 |
| CA | 2123248 | 5/1994 |
| CA | 2169216 | 2/1996 |
| CA | 2326966 | 11/2000 |
| CA | 2414643 | 5/2003 |

* cited by examiner

COMPOSITE BAMBOO SPORTING IMPLEMENT

FIELD OF INVENTION

The invention relates to a composite sporting implement made primarily of bamboo and in the preferred embodiment made of bamboo and lightweight aircraft-grade titanium alloy. More particularly, the invention is directed to the construction of a bamboo and titanium alloy sporting implement that incorporates a woven bamboo layer in various external surfaces and internal structural layers. Additionally, in the portion of the sporting implement that comes into contact with a sporting object such as a puck or a ball, an aircraft-grade titanium alloy used in laminate combination or woven or wrapped with a bamboo structure provide improved strength to the sporting implement extending the playing life and performance of sporting implement. The sporting implement invention is generally applicable to a wide variety of existing sporting implements comprising baseball bats, cricket bats, hockey sticks, field hockey sticks, lacrosse sticks, tennis, badminton and racquetball rackets, and the like.

BACKGROUND OF INVENTION

The requirement for a low-cost lightweight and strong materials for the construction of sporting implements have long existed in the sporting goods equipment world. Improvements in alternative materials to date usually improve the strength and weight components with new synthetic materials usually at a significant increase in both materials and fabrication cost. The present invention uses the combination of bamboo, very abundant and renewable natural fiber source, and an aircraft-grade titanium alloy to reinforce the high stress area of the sporting implement. Bamboo as alternative to poplar hardwoods is harder and therefore stronger, and is more resistant to warping due to less overall moisture content. The primary reason of bamboo's superior strength are the bamboo fibers that run along the length the bamboo stalk. To utilize these fibers, the exterior and innermost interior surface of the bamboo stalk are removed such that the internal bamboo fibers remain.

One objective of this invention relates to the novel use of constructing bamboo and bamboo in combination with aircraft-grade titanium alloy in laminate form for sporting implements. The laminate layers of bamboo are oriented at alternating angles with respect to adjoining layers thereby increasing the strength of the total composite laminate bamboo structure. Bamboo layers may also be treated with a bleaching solution, preferentially, hydrogen peroxide, which removes excess water and impurities from the bamboo yielding a lighter and stronger sporting implement.

Another objective of this invention related to a laminate layer consisting of woven bamboo may be used on external portions of the sporting implement to increase the frictional resistance of the surface for better tactile gripping by a player and increased control of a sporting object like a ball or puck when in contact with the woven surface. The laminate woven layer may also be incorporated into an inner layer of the impact portion of the sporting implement giving increased strength and durability to the sporting implement.

Another objective of the invention is include an aircraft-grade titanium alloy in the form of a thin plate as a laminate layer in the laminate bamboo structure, or a foil that is woven with bamboo or wrapped around a centrally located bamboo core to provide superior strength and durability to the sporting implement and while maintaining a very lightweight overall weight.

Although a handful of other devices are known, no other device meets the objectives of providing a bamboo laminate sporting implement with an elongated handle having multiple layers of bamboo and an impact portion having multiple laminate layers affixed to the elongated handle suitable to strike, carry or throw a sporting object, wherein both the handle and impact portion alternates in grain direction between adjoining bamboo layers at an angle between 30 to 90 degrees. Additionally, no other device meets the objectives of providing bamboo layers treated with a bleaching or hydrogen peroxide solution to remove impurities and excess moisture thereby reducing the weight and maintaining the strength of the at least one impact portion bamboo layer. Finally, no other device meets the objectives of providing at least one internal impact portion layer has at least a portion of aircraft-grade titanium alloy in either a plate or foil form for strengthening the impact portion in combination with a bamboo structure.

SUMMARY OF THE PRIOR ART

U.S. Pat. No. 4,591,155, and Canadian Patents 1,150,331, 1,151,693, 1,183,883, 1,206,309, 1,233,738, 2,037,273, 2,062,635 and 2,326,966 show the general state of the art in the methods of construction and construction of composite hockey sticks, most with natural fiber materials comprising of poplar hardwood construction.

U.S. Pat. Nos. 4,148,482 and 5,496,027, and Canadian Patents 1,138,912, 2,123,248 and 2,414,643 show a woven or braided reinforcing "sock" that slips over the blade of the hockey stick and is generally reinforced with resin material.

Canadian Patents 1,099,761 and 2,169,216 show hockey sticks with a completely metal composite blade portion and a shaft with a laminate layer having a metal reinforcing portion applied by a metal deposition process, respectively.

U.S. Pat. Nos. 4,010,884, 5,558,728, 5,866,272, 5,933,703, 5,939,213, 5,951,800 and 6,114,050 show various titanium alloy foil used in composite with other materials generally in the aerospace field. None of these references teach any type of natural fiber material used in combination with titanium alloy foil.

U.S. Pat. No. 6,042,493 shows a metal baseball bat reinforced with fiber and a metallic composite, the fiber being a synthetic fiber Kevlar™, Spectra™ or Vectran™. U.S. Pat. No. 6,265,064 shows a method for depositing titanium oxide powder on natural fibers, the fibers including those in the garment field of wool, silk and cotton. As shown, neither reference alone or in combination teaches the present invention of a composite bamboo material with titanium alloy plate or foil laminates.

SUMMARY OF THE INVENTION

The first general embodiment of the invention is of a laminate bamboo sporting implement with an elongated handle having multiple layers of bamboo and an impact portion affixed to the elongated handle suitable to strike, carry or throw a sporting object, the impact portion having multiple layers of bamboo. The sporting implement comprising each of the elongated handle bamboo layers having an average thickness of 1.0 to 3.0 mm, each of the elongated handle bamboo layers alternating grain direction at an angle between 30 to 90 degrees with respect adjoining elongated handle bamboo layers' grain direction, and each of the elongated handle bamboo layers is treated with a hydrogen peroxide solution to remove impurities and excess moisture thereby reducing the weight and maintaining the strength of the elongated handle bamboo layers. Each of the impact portion bamboo layers alternate grain direction at an angle between 30 to 90 degrees with respect adjoining impact portion bamboo layers' grain direction, and at least one impact portion bamboo layer treated with a hydrogen peroxide solution to remove impurities and excess moisture thereby reducing the weight and maintaining the strength of the at least one impact portion bamboo layer. The elongated handle and the impact portion bamboo layers may be then held together with hot pressed cured adhesive.

A specific feature of the invention further comprises at least one woven bamboo layer of alternating strips of bamboo having a width of 2.0 to 20.0 mm and thickness of less than 5.0 mm. At least one woven bamboo layer comprises a weave of two sections of bamboo strips intersecting each other at an angle between 90 to 45 degrees, an alternatively, may comprise of a weave of three sections of bamboo strips intersecting each other at an angle of 60 degrees. The at least one woven bamboo layer may be located externally on the elongated handle or located externally on at least one side of the impact portion. Additionally, the at least one woven bamboo layer may be located internally in the impact portion. The woven bamboo layer may be treated with a hydrogen peroxide solution to remove impurities and excess moisture thereby reducing the weight and maintaining the strength of the woven layer.

The elongated handle and the impact portion may be removeably affixed together to allow interchanging of replacement sporting implement members with the elongated handle and the impact portion. The elongated handle in the preferred embodiment of the invention comprises between 6 to 12 layers of bamboo, and the impact blade comprises between 5 to 9 layers of bamboo.

One embodiment of the invention has the impact portion comprising of a first woven bamboo outer layer, a first solid bamboo inner layer, a solid centrally oriented bamboo layer, a second solid bamboo inner layer, and a second woven bamboo outer layer. All bamboo layers but the solid centrally oriented bamboo layer may be treated with a hydrogen peroxide solution to remove impurities and excess moisture, thereby reducing the weight and maintaining the strength of all the bamboo layers but the solid centrally oriented bamboo layer.

Alternatively, the laminate bamboo sporting implement may have all bamboo layers treated with a hydrogen peroxide solution to remove impurities and excess moisture, thereby reducing the weight and maintaining the strength of all the bamboo layers.

A second general preferred embodiment of the invention is of a composite laminate bamboo sporting implement with an elongated handle having multiple layers of bamboo, and an impact portion affixed to the elongated handle suitable to strike, carry or throw a sporting object, the impact portion having multiple laminate layers. Each of the elongated handle bamboo layers has an average thickness of 1.0 to 3.0 mm, alternates grain direction at an angle between 30 to 90 degrees with respect adjoining elongated handle bamboo layers' grain direction, and may be treated with a hydrogen peroxide solution to remove impurities and excess moisture thereby reducing the weight and maintaining the strength of the elongated handle bamboo layers. Each of the impact portion bamboo layers with alternating grain direction at an angle between 30 to 90 degrees with respect adjoining impact portion bamboo layers' grain direction. At least one impact portion bamboo layer may be treated with a hydrogen peroxide solution to remove impurities and excess moisture thereby reducing the weight and maintaining the strength of the at least one impact portion bamboo layer. At least one internal impact portion layer has at least a portion of aircraft-grade titanium alloy for strengthening the impact portion, and the elongated handle and the impact portion may be held together with hot pressed cured adhesive.

One embodiment of the second general preferred embodiment shows the impact portion has a forward facing profile where the sporting implement may be struck, carried or thrown, wherein the at least one internal layer having at least a portion of aircraft-grade titanium alloy comprises a solid piece of titanium that generally covers the forward facing profile of the impact portion wherein the portion of aircraft-grade titanium alloy is less then 2 mm in thickness. An embodiment of this type could comprise of an impact portion having a first woven bamboo outer layer, a first solid bamboo inner layer, a solid centrally oriented aircraft-grade titanium plate layer, a second solid bamboo inner layer, and a second woven bamboo outer layer. All bamboo layers may be treated with a hydrogen peroxide solution to remove impurities and excess moisture, thereby reducing the weight and maintaining the strength of all the bamboo layers.

An alternative embodiment of the second general preferred embodiment shows at least one internal layer having at least a portion of aircraft-grade titanium alloy in the impact portion of the implement further comprises a woven layer of alternating strips of bamboo and aircraft-grade titanium alloy, each of the strips having a width of 2.0 to 20.0 mm and thickness of less than 5.0 mm. The woven layer of alternating strips of bamboo and aircraft-grade titanium alloy further comprises a weave of either two sections of the alternating strips intersecting each other at an angle between 90 to 45 degrees, or of three sections of alternating strips intersecting each other at an angle of 60 degrees. An embodiment of this type could comprise of an impact portion comprising a first woven bamboo outer layer, a first solid bamboo inner layer, a first woven bamboo and aircraft-grade titanium foil inner layer, a solid centrally oriented bamboo layer, a second woven bamboo and aircraft-grade titanium foil inner layer, a second solid bamboo inner layer; and a second woven bamboo outer layer. All bamboo layers but the solid centrally oriented bamboo layer may be treated with a hydrogen peroxide solution to remove impurities and excess moisture, thereby reducing the weight and maintaining the strength of all the bamboo layers but the solid centrally oriented bamboo layer, or alternatively, all bamboo layers may be treated with a hydrogen peroxide solution.

Another alternative embodiment of the second general preferred embodiment comprises at least one internal layer having at least the portion of aircraft-grade titanium alloy in the impact portion of the implement further comprising a solid centrally positioned core of bamboo, and a portion of aircraft-grade titanium foil wrapped around the solid centrally positioned core of bamboo. The solid centrally positioned core of bamboo having a forward and rearward facing portions, wherein the wrapped portion of aircraft-grade titanium alloy may either completely cover or partially cover the forward and rearward facing portions of the solid centrally positioned core of bamboo. The wrapped portion of aircraft-grade titanium alloy may also overlaps upon itself when wrapped around the solid centrally positioned core of bamboo. An embodiment of this type could comprise of a first woven bamboo outer layer, a first solid bamboo inner layer, a solid centrally oriented bamboo layer having a portion thereof wrapped in aircraft-grade titanium foil, a second solid bamboo inner layer, and a second woven bamboo outer layer. All bamboo layers but the solid centrally oriented bamboo layer may be treated with a hydrogen peroxide solution to remove impurities and excess moisture, thereby reducing the weight and maintaining the strength of all the bamboo layers but the solid centrally oriented bamboo layer, or all bamboo layers, inclusively, may be treated with a hydrogen peroxide solution.

A specific feature of the invention further comprises at least one woven bamboo layer of alternating strips of bamboo having a width of 2.0 to 20.0 mm and thickness of less than 5.0 mm. The woven bamboo layer comprises a weave of either two sections of bamboo strips intersecting each other at an angle between 90 to 45 degrees, or of three sections of bamboo strips intersecting each other at an angle of 60 degrees. The at least one woven bamboo layer may be located externally on the elongated handle or located externally on at least one side of the impact portion. Additionally, the at least one woven bamboo layer may be located internally in the impact portion. The at least one woven bamboo layer may be treated with a hydrogen peroxide solution to remove impurities and excess moisture thereby reducing the weight and maintaining the strength of the woven layer.

The elongated handle and the impact portion of the second general preferred embodiment may be removeably affixed together to allow interchanging of replacement sporting implement members with the elongated handle and the impact portion, wherein the elongated handle comprises between 6 to 12 layers of bamboo, and the impact portion comprises between 5 to 9 layers of bamboo.

The lightweight, durability of construction and the improved combination of materials of the present invention will become more readily apparent from a consideration of the following drawings and description.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

DETAILED DESCRIPTION OF THE INVENTION

Figures 1A, 1B, 1C:
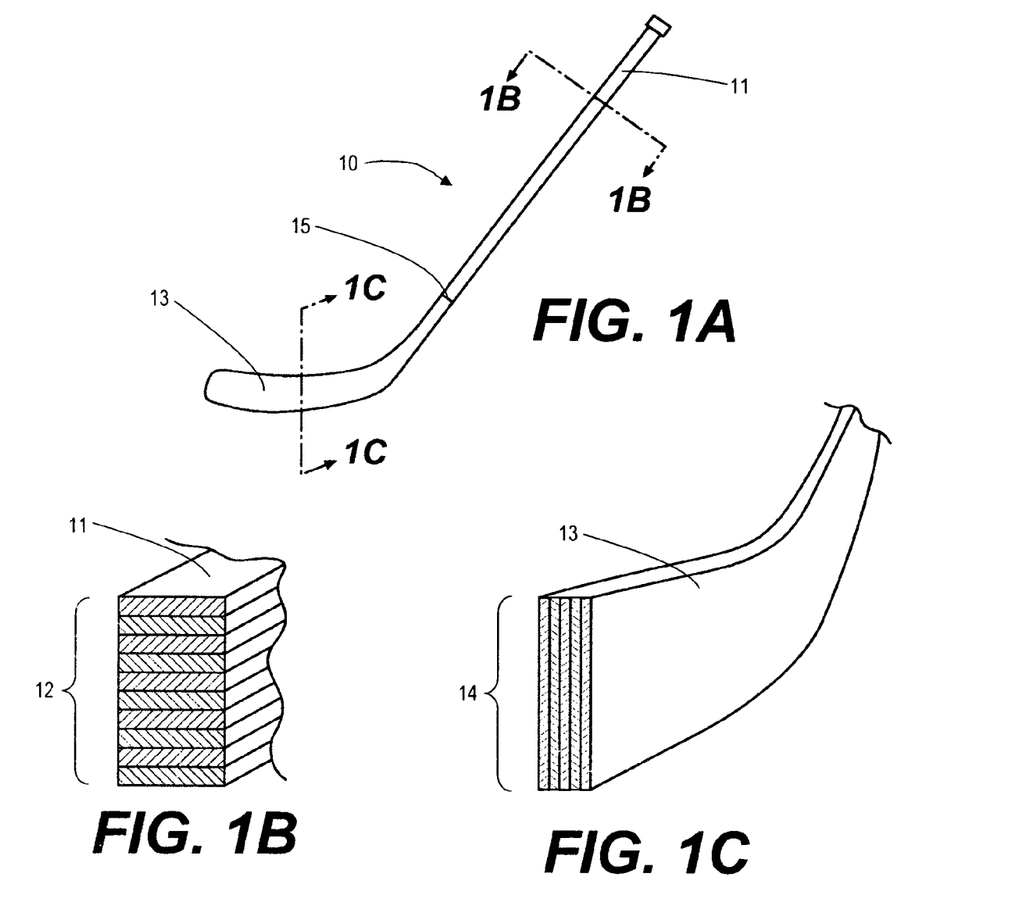
FIG. 1A shows a profile of an example of the preferred embodiment as applied to a hockey stick.
FIG. 1B shows a cross section view taken at a handle portion of a sporting implement.
FIG. 1C shows a cross section view taken at a blade or impact portion of a sporting implement.

FIGS. 1A–C shows the first general embodiment of the invention as laminate bamboo sporting implement (10) with an elongated handle (11) having multiple layers of bamboo (12) and an impact portion (13) affixed to the elongated handle (11) suitable to strike, carry or throw a sporting object the impact portion (13) having multiple layers of bamboo (14). The sporting implement (10) comprising each of the elongated handle bamboo layers (12) has an average thickness of 1.0 to 3.0 mm.

Figure 2:
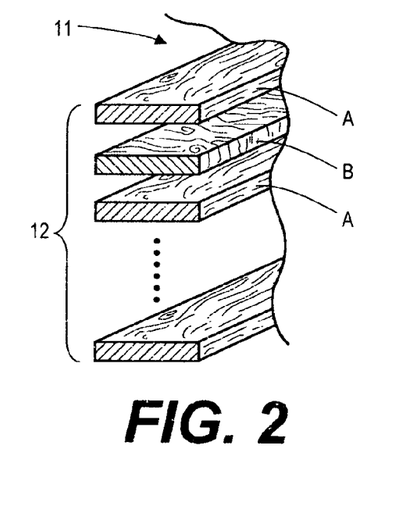
FIG. 2 shows an exploded view of the handle portion of FIG. 1B showing alternating grain patterns with respect to each adjoining layer.

FIG. 2 shows each of the elongated handle bamboo layers (12) alternating grain direction at an angle between 30 to 90 degrees with respect adjoining elongated handle bamboo layers' grain direction. This is shown by reference characters A and B in FIG. 2. The layers designated by reference letter A represent bamboo layers wherein the grain direction is oriented at an angle between 30 to 90 degrees with respect to the grain direction of the bamboo layer represented by reference letter B. Additionally, each of the elongated handle bamboo layers is treated with a hydrogen peroxide solution to remove impurities and excess moisture thereby reducing the weight and maintaining the strength of the elongated handle bamboo layers.

Figure 3:
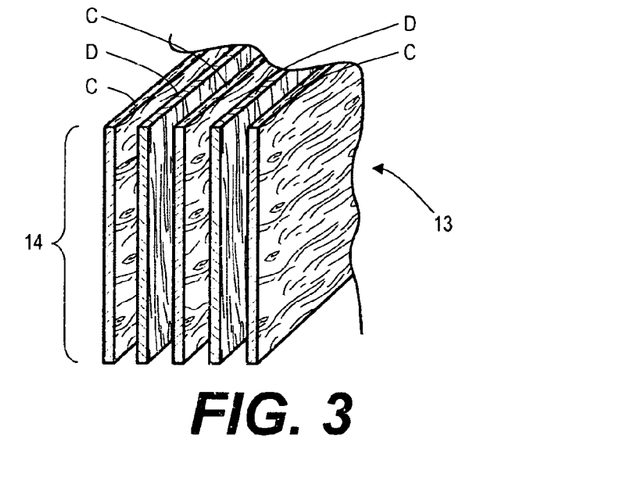
FIG. 3 shows an exploded view of the blade or impact portion of FIG. 1C showing alternating grain patterns with respect to each adjoining layer.

FIG. 3 shows each of the impact portion bamboo layers (14) alternate grain direction at an angle between 30 to 90 degrees with respect adjoining impact portion bamboo layers' grain direction. This is shown by reference characters C and D in FIG. 2. The layers designated by reference letter C represent bamboo layers wherein the grain direction is oriented at an angle between 30 to 90 degrees with respect to the grain direction of the bamboo layer represented by reference letter D. Additionally, at least one impact portion bamboo layer treated with a hydrogen peroxide solution to remove impurities and excess moisture thereby reducing the weight and maintaining the strength of the at least one impact portion bamboo layer. The elongated handle and the impact portion bamboo layers (12 & 14) may be then held together with hot pressed cured adhesive.

FIG. 1 The elongated handle (11) and the impact portion (13) may be removeably affixed together to at an intersection point (15) to allow interchanging of replacement sporting implement members with the elongated handle (11) and the impact portion (13). The elongated handle in the preferred embodiment of the invention comprises between 6 to 12 layers of bamboo (at 12), and the impact blade comprises between 5 to 9 layers of bamboo (at 14).

Figure 4:
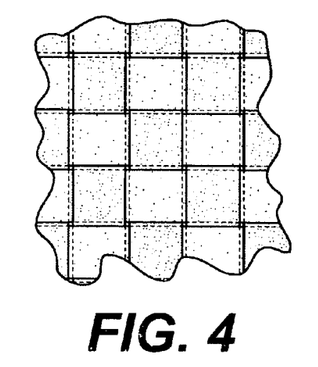
FIG. 4 shows a representative view of a woven bamboo layer comprising of bamboo strips intersecting each other at a right angle.
Figure 5:
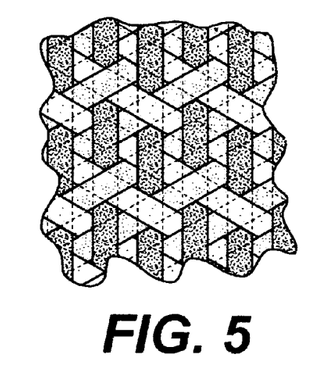
FIG. 5 shows a representative view of a woven bamboo layer comprising of bamboo strips intersecting each other from three directions or at a 60 degree angle.
Figure 6:
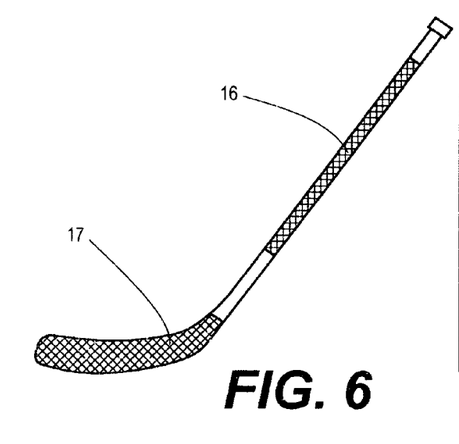
FIG. 6 shows a profile view of an example of the preferred embodiment as applied to a hockey stick showing a woven bamboo layer applied externally to the handle and impact portion of the sporting implement.

FIG. 4 shows a specific feature of the invention that includes a woven bamboo layer of alternating strips of bamboo having a width of 2.0 to 20.0 mm and an overall thickness of less than 5.0 mm. At least one woven bamboo layer comprises a weave of two sections of bamboo strips intersecting each other at an angle between 90 degrees, (as shown in FIG. 4), to 45 degrees. Alternatively, FIG. 5 shows a weave of three sections of bamboo strips intersecting each other at an angle of 60 degrees. FIG. 6 shows the woven bamboo layer may be located externally on the elongated handle (16) and/or located externally on at least one side of the impact portion (17). Additionally, the at least one woven bamboo layer may be located internally in the impact portion as later shown in FIG. 11. Finally, the woven bamboo layer may be treated with a hydrogen peroxide solution to remove impurities and excess moisture thereby reducing the weight and maintaining the strength of the woven layer.

Figure 7:
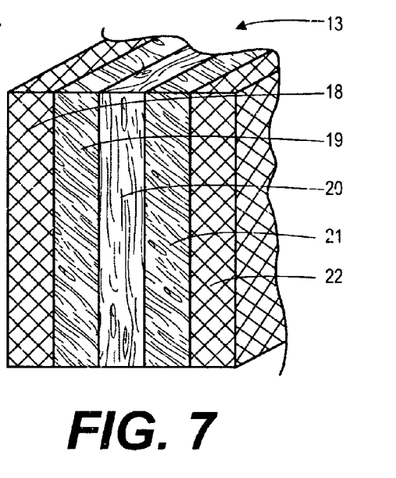
FIG. 7 shows a cross section of an all bamboo first embodiment of the impact portion of the sporting implement.

FIG. 7 shows one embodiment of the invention has the impact portion (13) comprising of a first woven bamboo outer layer (18), a first solid bamboo inner layer (19), a solid centrally oriented bamboo layer (20), a second solid bamboo inner layer (21), and a second woven bamboo outer layer (22). All bamboo layers but the solid centrally oriented bamboo layer (20) may be treated with a hydrogen peroxide solution to remove impurities and excess moisture, thereby reducing the weight and maintaining the strength of all the bamboo layers but the solid centrally oriented bamboo layer.

Alternatively, the laminate bamboo sporting implement (10) may have all bamboo layers (18–22) treated with a hydrogen peroxide solution to remove impurities and excess moisture, thereby reducing the weight and maintaining the strength of all the bamboo layers.

FIGS. 8–14 show a second general preferred embodiment of the invention is of a composite laminate bamboo sporting implement (10) with an elongated handle (11) having multiple layers of bamboo (12), and an impact portion (13) affixed to the elongated handle (11) suitable to strike, carry or throw a sporting object, the impact portion having multiple laminate layers. Again, each of the elongated handle bamboo layers (12) has an average thickness of 1.0 to 3.0 mm, alternates grain direction at an angle between 30 to 90 degrees with respect adjoining elongated handle bamboo layers' grain direction, (as generally shown in FIG. 2) and may be treated with a hydrogen peroxide solution to remove impurities and excess moisture thereby reducing the weight and maintaining the strength of the elongated handle bamboo layers. Each of the impact portion bamboo layers (14) alternates grain direction at an angle between 30 to 90 degrees with respect adjoining impact portion bamboo layers' grain direction, (as generally shown in FIG. 3). At least one impact portion bamboo layer may be treated with a hydrogen peroxide solution to remove impurities and excess moisture thereby reducing the weight and maintaining the strength of the at least one impact portion bamboo layer. However, FIGS. 8–14 show the addition of at least one internal impact portion layer (reference no. 14 of FIGS. 1C and 3) having an aircraft-grade titanium alloy for strengthening the impact portion, wherein the elongated handle and the impact portion may be held together with hot pressed cured adhesive as the previous embodiments of FIGS. 1–7.

Figure 8:
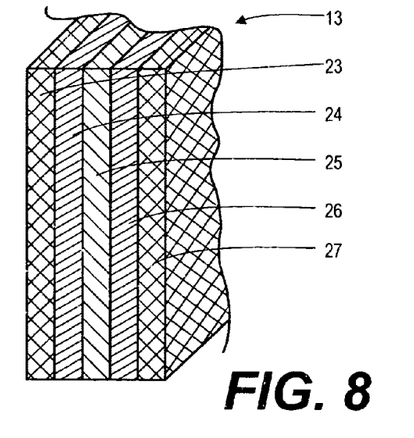
FIG. 8 shows a cross section of an alternative embodiment of the impact portion of the sporting implement have a centrally oriented titanium alloy plate.

FIG. 8 shows one specific embodiment of the second general preferred embodiment with the impact portion (13) having forward facing profile where the sporting implement may be struck, carried or thrown, wherein the at least one internal layer (25) having at least a portion of aircraft-grade titanium alloy comprises a solid piece of titanium that generally covers the forward facing profile of the impact portion wherein the portion of aircraft-grade titanium alloy is less then 2 mm in thickness. An embodiment of this type could comprise of an impact portion having a first woven bamboo outer layer (23), a first solid bamboo inner layer (24), a solid centrally oriented aircraft-grade titanium plate layer (25), a second solid bamboo inner layer (26), and a second woven bamboo outer layer (27). All bamboo layers may be treated with a hydrogen peroxide solution to remove impurities and excess moisture, thereby reducing the weight and maintaining the strength of all the bamboo layers. The outer woven bamboo layers (23 & 27) are of the type disclosed in FIGS. 4 & 5, and as disclosed above.

Figure 9:
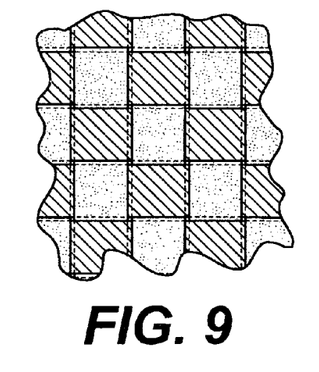
FIG. 9 shows a representative view of a woven bamboo-titanium foil layer comprising of bamboo strips in a first direction and titanium foil strips woven in a second direction intersecting each other at a right angle.
Figures 10, 11, 12, 13, 14:
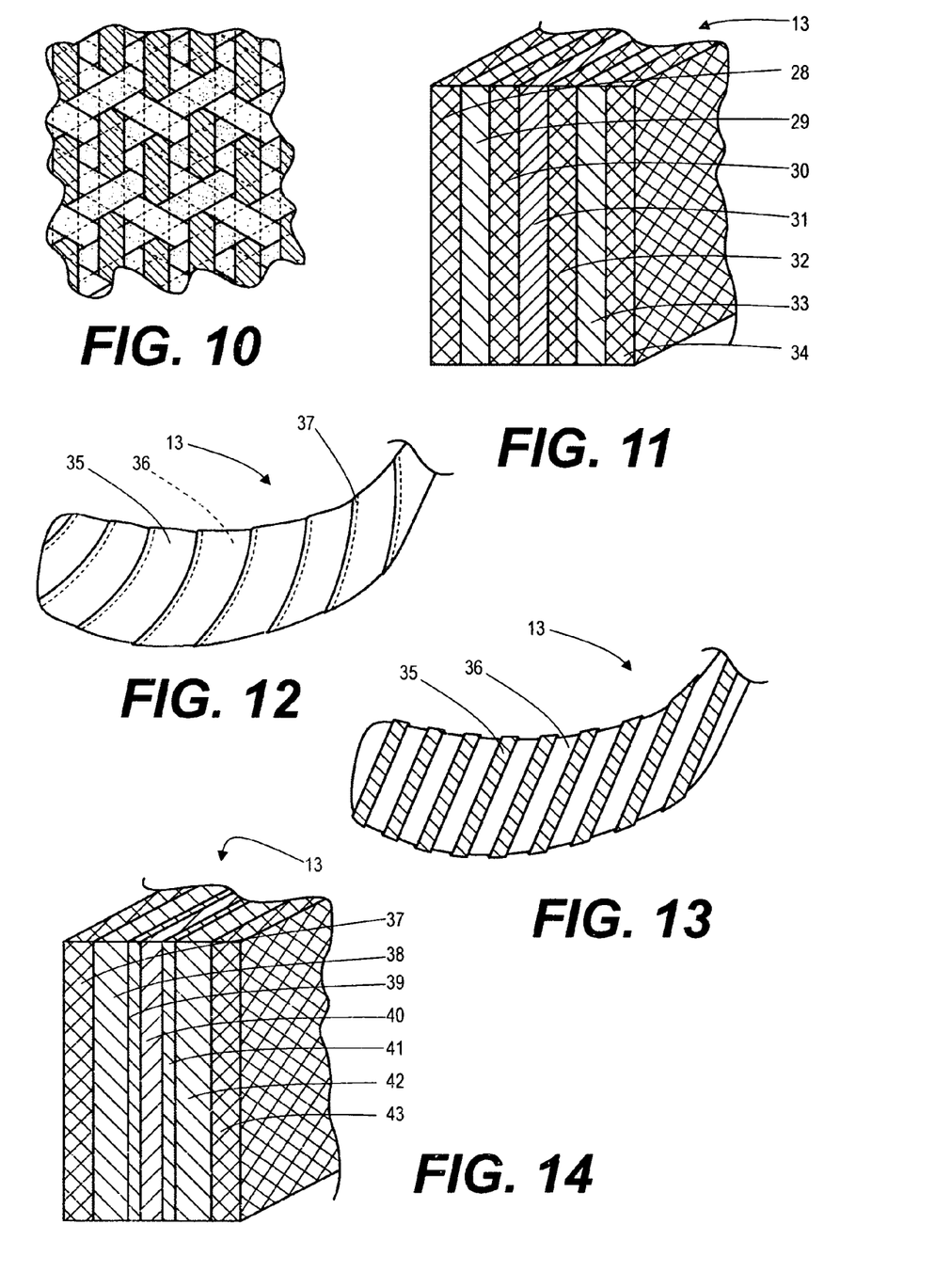
FIG. 10 shows a representative view of a woven bamboo-titanium foil layer comprising of alternating bamboo and titanium foil strips intersecting each other from three directions or at a 60 degree angle.
FIG. 11 shows a cross section of an alternative embodiment of the impact portion of the sporting implement having two layers of woven bamboo-titanium foil disposed around a centrally oriented solid bamboo core.
FIG. 12 shows a front view of an inner oriented bamboo layer having titanium foil wrapped in an overlapping fashion to completely cover the inner bamboo layer.
FIG. 13 shows a front view of an inner oriented bamboo layer having titanium foil wrapped in a partially overlapping fashion to partially cover the inner bamboo layer.
FIG. 14 shows a cross section of an alternative embodiment of the impact portion of the sporting implement having a centrally oriented solid bamboo layer wrapped in titanium foil, as shown in FIG. 12.

FIGS. 9 & 10 show an alternative embodiment of the second general preferred embodiment of at least one internal layer having at least a portion of aircraft-grade titanium alloy in the impact portion of the implement further including a woven layer of alternating strips of bamboo and aircraft-grade titanium alloy, each of the strips having a width of 2.0 to 20.0 mm and an overall thickness of less than 5.0 mm. The woven layer of alternating strips of bamboo and aircraft-grade titanium alloy further comprises a weave of either two sections of the alternating strips intersecting each other at an angle between 90 (as shown in FIG. 9) to 45 degrees, or of three sections of alternating strips intersecting each other at an angle of 60 degrees (as shown in FIG. 10). FIG. 11 shows an embodiment of this type including of an impact portion (13) including a first woven bamboo outer layer (28), a first solid bamboo inner layer (29), a first woven bamboo and aircraft-grade titanium foil inner layer (30), a solid centrally oriented bamboo layer (31), a second woven bamboo and aircraft-grade titanium foil inner layer (32), a second solid bamboo inner layer (33) and a second woven bamboo outer layer (34). All bamboo layers but the solid centrally oriented bamboo layer (31) may be treated with a hydrogen peroxide solution to remove impurities and excess moisture, thereby reducing the weight and maintaining the strength of all the bamboo layers but the solid centrally oriented bamboo layer, or alternatively, all bamboo layers (28–34) may be treated with a hydrogen peroxide solution.

FIGS. 12–13 shows another alternative embodiment of the second general preferred embodiment comprises at least one internal layer having at least the portion of aircraft-grade titanium alloy in the impact portion (13) of the implement (10) further comprising a solid centrally positioned core of bamboo, and a portion of aircraft-grade titanium foil (35) wrapped around the solid centrally positioned core of bamboo (36). The solid centrally positioned core of bamboo (36) having a forward and rearward facing portions, wherein the wrapped portion of aircraft-grade titanium alloy (35) may either completely cover (as shown in FIG. 12) or partially cover (as shown in FIG. 13) the forward and rearward facing portions of the solid centrally positioned core of bamboo (36). The wrapped portion of aircraft-grade titanium alloy (35) may also overlaps (37) upon itself when wrapped around the solid centrally positioned core of bamboo (36).

FIG. 13 shows an embodiment of this type including of a first woven bamboo outer layer (37), a first solid bamboo inner layer (38), a solid centrally oriented bamboo layer (40) having a portion thereof wrapped in aircraft-grade titanium foil (represented by reference nos. 39 & 41), a second solid bamboo inner layer (42), and a second woven bamboo outer layer (43). All bamboo layers but the solid centrally oriented bamboo layer may be treated with a hydrogen peroxide solution to remove impurities and excess moisture, thereby reducing the weight and maintaining the strength of all the bamboo layers but the solid centrally oriented bamboo layer, or all bamboo layers, inclusively, may be treated with a hydrogen peroxide solution.

The embodiment of FIGS. 9–14 includes the same construction of the woven bamboo layer of alternating strips of bamboo having a width of 2.0 to 20.0 mm and thickness of less than 5.0 mm as disclosed in the embodiment of FIGS. 1–8. As shown in FIGS. 8, 11 & 12, the woven bamboo layer may be located externally on the impact portion (13) of the implement (10). Additionally, the woven bamboo layer may also be located internally in the impact portion (13). As indicated previously, the woven bamboo layer may be treated with a hydrogen peroxide solution to remove impurities and excess moisture thereby reducing the weight and maintaining the strength of the woven layer.

The foregoing disclosure and description of the invention are illustrative and explanatory thereof, and various changes in size, shape and materials as well as in the details of the illustrated construction may be made without departing from the spirit of the invention.

What is claimed in the preferred embodiment is:

1. A laminate bamboo sporting implement with an elongated handle having multiple layers of bamboo and an impact portion affixed to said elongated handle suitable to strike, carry or throw a sporting object, said impact portion having multiple layers of bamboo, said sporting implement comprising:
   each of said elongated handle bamboo layers having an average thickness of 1.0 to 3.0 mm;
   each of said elongated handle bamboo layers alternating grain direction at an angle between 30 to 90 degrees with respect adjoining elongated handle bamboo layers' grain direction;
   each of said elongated handle bamboo layers is treated with a hydrogen peroxide solution to remove impurities and excess moisture thereby reducing the weight and maintaining the strength of said elongated handle bamboo layers;
   each of said impact portion bamboo layers alternating grain direction at an angle between 30 to 90 degrees with respect adjoining impact portion bamboo layers' grain direction;
   at least one impact portion bamboo layer treated with a hydrogen peroxide solution to remove impurities and excess moisture thereby reducing the weight and maintaining the strength of said at least one impact portion bamboo layer; and
   wherein at least one bamboo layer comprises a woven bamboo layer of alternating strips of bamboo having a width of 2.0 to 20.0 mm and thickness of less than 5.0 mm.

2. The laminate bamboo sporting implement of claim 1, wherein said at least one woven bamboo layer comprises a weave of two sections of bamboo strips intersecting each other at an angle between 90 to 45 degrees.

3. The laminate bamboo sporting implement of claim 1, wherein said at least one woven bamboo layer comprises a weave of three sections of bamboo strips intersecting each other at an angle of 60 degrees.

4. The laminate bamboo sporting implement of claim 1, wherein said at least one woven bamboo layer is located externally on said elongated handle.

5. The laminate bamboo sporting implement of claim 1, wherein said at least one woven bamboo layer is located externally on at least one side of said impact portion.

6. The laminate bamboo sporting implement of claim 1, wherein said at least one woven bamboo layer is located internally in said impact portion.

7. The laminate bamboo sporting implement of claim 1, wherein said at least one woven bamboo layer is treated with a hydrogen peroxide solution to remove impurities and excess moisture thereby reducing the weight and maintaining the strength of said woven layer.

8. The laminate bamboo sporting implement of claim 1, wherein:
   said elongated handle comprises between 6 to 12 layers of bamboo; and
   said impact portion comprises between 5 to 9 layers of bamboo.

9. The laminate bamboo sporting implement of claim 1, wherein said impact portion comprises:
   1) a first woven bamboo outer layer;
   2) a first solid bamboo inner layer;
   3) a solid centrally oriented bamboo layer;
   4) a second solid bamboo inner layer; and
   5) a second woven bamboo outer layer.

10. The laminate bamboo sporting implement of claim 9, wherein all bamboo layers but said solid centrally oriented bamboo layer are treated with a hydrogen peroxide solution to remove impurities and excess moisture, thereby reducing the weight and maintaining the strength of all said bamboo layers but said solid centrally oriented bamboo layer.

11. The laminate bamboo sporting implement of claim 1, wherein all bamboo layers are treated with a hydrogen peroxide solution to remove impurities and excess moisture, thereby reducing the weight and maintaining the strength of all said bamboo layers.

12. A laminate bamboo sporting implement for attachment to an elongated handle said sporting implement having an impact portion suitable to strike, carry or throw a sporting object, said impact portion having multiple layers of bamboo, said sporting implement comprising:
   each of said impact portion bamboo layers alternating grain direction at an angle between 30 to 90 degrees with respect adjoining impact portion bamboo layers' grain direction;
   at least one impact portion bamboo layer treated with a hydrogen peroxide solution to remove impurities and excess moisture thereby reducing the weight and maintaining the strength of said at least one impact portion bamboo layer; and
   at least one woven bamboo layer of alternating strips of bamboo having a width of 2.0 to 20.0 mm and thickness of less than 5.0 mm.

13. The laminate bamboo sporting implement of claim 12, wherein all bamboo layers are treated with a hydrogen peroxide solution to remove impurities and excess moisture, thereby reducing the weight and maintaining the strength of all said bamboo layers.

14. A composite laminate bamboo sporting implement for attachment to an elongated handle, said sporting implement having an impact portion suitable to strike, carry or throw a sporting object, said impact portion having multiple laminate layers, said composite sporting implement comprising:

said impact portion multiple laminate layers comprising at least two bamboo layers with alternating grain direction at an angle between 30 to 90 degrees with respect adjoining impact portion bamboo layers' grain direction;

at least one impact portion bamboo layer treated with a hydrogen peroxide solution to remove impurities and excess moisture thereby reducing the weight and maintaining the strength of said at least one impact portion bamboo layer; and at least one internal impact portion layer having at least a portion of aircraft-grade titanium alloy for strengthening said impact portion, said impact portion having a forward facing profile where said sporting implement is struck, carried or thrown, wherein said at least one internal layer having at least a portion of aircraft-grade titanium alloy comprises a solid piece of titanium that generally covers said forward facing profile of said impact portion.

15. The composite laminate bamboo sporting implement of claim 14, wherein said at least one internal layer having at least a portion of aircraft-grade titanium alloy is less then 2 mm in thickness.

16. The composite laminate bamboo sporting implement of claim 14, wherein said impact portion comprises:
1) a first woven bamboo outer layer;
2) a first solid bamboo inner layer;
3) a solid centrally oriented aircraft-grade titanium plate layer;
4) a second solid bamboo inner layer; and
5) a second woven bamboo outer layer.

17. The laminate bamboo sporting implement of claim 14, wherein all bamboo layers are treated with a hydrogen peroxide solution to remove impurities and excess moisture, thereby reducing the weight and maintaining the strength of all said bamboo layers.

18. The composite laminate bamboo sporting implement of claim 14, wherein:
said impact portion comprises between 5 to 9 layers of bamboo.

19. A composite laminate bamboo sporting implement for attachment to an elongated handle, said sporting implement having an impact portion suitable to strike, carry or throw a sporting object, said impact portion having multiple laminate layers, said composite sporting implement comprising:

said impact portion multiple laminate layers comprising at least two bamboo layers with alternating grain direction at an angle between 30 to 90 degrees with respect adjoining impact portion bamboo layers' grain direction;

at least one impact portion bamboo layer treated with a hydrogen peroxide solution to remove impurities and excess moisture thereby reducing the weight and maintaining the strength of said at least one impact portion bamboo layer; and at least one internal impact portion layer having at least a portion of aircraft-grade titanium alloy for strengthening said impact portion, wherein said at least one internal impact portion layer of said implement comprises a woven layer of alternating strips of bamboo and aircraft-grade titanium alloy, each of said strips having a width of 2.0 to 20.0 mm and thickness of less than 5.0 mm.

20. The composite laminate bamboo sporting implement of claim 19, wherein said woven layer of alternating strips of bamboo and aircraft-grade titanium alloy further comprises a weave of two sections of said alternating strips intersecting each other at an angle between 90 to 45 degrees.

21. The composite laminate bamboo sporting implement of claim 19, wherein said woven layer of alternating strips of bamboo and aircraft-grade titanium alloy comprises a weave of three sections of alternating strips intersecting each other at an angle of 60 degrees.

22. The composite laminate bamboo sporting implement of claim 19, wherein said impact portion comprises:
1) a first woven bamboo outer layer;
2) a first solid bamboo inner layer;
3) a first woven bamboo and aircraft-grade titanium foil inner layer;
4) a solid centrally oriented bamboo layer;
5) a second woven bamboo and aircraft-grade titanium foil inner layer;
6) a second solid bamboo inner layer; and
7) a second woven bamboo outer layer.

23. The laminate bamboo sporting implement of claim 22, wherein all bamboo layers but said solid centrally oriented bamboo layer are treated with a hydrogen peroxide solution to remove impurities and excess moisture, thereby reducing the weight and maintaining the strength of all said bamboo layers but said solid centrally oriented bamboo layer.

24. The laminate bamboo sporting implement of claim 22, wherein all bamboo layers are treated with a hydrogen peroxide solution to remove impurities and excess moisture, thereby reducing the weight and maintaining the strength of all said bamboo layers.

25. The laminate bamboo sporting implement of claim 19, wherein all bamboo layers are treated with a hydrogen peroxide solution to remove impurities and excess moisture, thereby reducing the weight and maintaining the strength of all said bamboo layers.

26. A composite laminate bamboo sporting implement for attachment to an elongated handle said sporting implement having an impact portion suitable to strike, carry or throw a sporting object said impact portion having multiple laminate layers, said composite sporting implement comprising:

said impact portion multiple laminate layers comprising at least two bamboo layers with alternating grain direction at an angle between 30 to 90 degrees with respect adjoining impact portion bamboo layers' grain direction;

at least one impact portion bamboo layer treated with a hydrogen peroxide solution to remove impurities and excess moisture thereby reducing the weight and maintaining the strength of said at least one impact portion bamboo layer; and at least one internal impact portion layer having at least a portion of aircraft-grade titanium alloy for strengthening said impact portion, wherein said at least one internal impact layer having at least said portion of aircraft-grade titanium alloy in said impact portion of said implement further comprises:
a solid centrally positioned core of bamboo; and
said at least a portion of aircraft-grade titanium having foil wrapped around said solid centrally positioned core of bamboo.

27. The composite laminate bamboo sporting implement of claim 26, said solid centrally positioned core of bamboo having a forward and rearward facing portions, wherein said wrapped portion of aircraft-grade titanium alloy completely covers said forward and rearward facing portions of said solid centrally positioned core of bamboo.

28. The composite laminate bamboo sporting implement of claim 26, said solid centrally positioned core of bamboo having a forward and rearward facing portions, wherein said wrapped portion of aircraft-grade titanium alloy partially covers said forward and rearward facing portions of said solid centrally positioned core of bamboo.

29. The composite laminate bamboo sporting implement of claim 26, wherein said wrapped portion of aircraft-grade titanium alloy overlaps upon itself when wrapped around said solid centrally positioned core of bamboo.

30. The composite laminate bamboo sporting implement of claim 26, wherein said impact portion comprises:
   1) a first woven bamboo outer layer;
   2) a first solid bamboo inner layer;
   3) a solid centrally oriented bamboo layer having a portion thereof wrapped in aircraft-grade titanium foil;
   4) a second solid bamboo inner layer; and
   5) a second woven bamboo outer layer.

31. The laminate bamboo sporting implement of claim 20, wherein all bamboo layers but said solid centrally oriented bamboo layer are treated with a hydrogen peroxide solution to remove impurities and excess moisture, thereby reducing the weight and maintaining the strength of all said bamboo layers but said solid centrally oriented bamboo layer.

32. The laminate bamboo sporting implement of claim 30, wherein all bamboo layers are treated with a hydrogen peroxide solution to remove impurities and excess moisture, thereby reducing the weight and maintaining the strength of all said bamboo layers.

33. The laminate bamboo sporting implement of claim 26, wherein all bamboo layers are treated with a hydrogen peroxide solution to remove impurities and excess moisture, thereby reducing the weight and maintaining the strength of all said bamboo layers.

34. A composite laminate bamboo sporting implement for attachment to an elongated handle, said sporting implement having an impact portion suitable to strike, carry or throw a sporting object, said impact portion having multiple laminate layers, said composite sporting implement comprising:
   said impact portion multiple laminate layers comprising at least two bamboo layers with alternating grain direction at an angle between 30 to 90 degrees with respect adjoining impact portion bamboo layers' grain direction;
   at least one impact portion bamboo layer treated with a hydrogen peroxide solution to remove impurities and excess moisture thereby reducing the weight and maintaining the strength of said at least one impact portion bamboo layer; and
   at least one internal impact portion layer having at least a portion of aircraft-grade titanium alloy for strengthening said impact portion, and
   at least one woven bamboo layer of alternating strips of bamboo having a width of 2.0 to 20.0 mm and thickness of less than 5.0 mm.

35. The composite laminate bamboo sporting implement of claim 34, wherein said at least one woven bamboo layer comprises a weave of two sections of bamboo strips intersecting each other at an angle between 90 to 45 degrees.

36. The composite laminate bamboo sporting implement of claim 34, wherein said at least one woven bamboo layer comprises a weave of three sections of bamboo strips intersecting each other at an angle of 60 degrees.

37. The composite laminate bamboo sporting implement of claim 34, wherein said at least one woven bamboo layer is located externally on at least one side of said impact portion.

38. The composite laminate bamboo sporting implement of claim 34, wherein said at least one woven bamboo layer is located internally in said impact portion.

39. The composite laminate bamboo sporting implement of claim 34, wherein said at least one woven bamboo layer is treated with a hydrogen peroxide solution to remove impurities and excess moisture thereby reducing the weight and maintaining the strength of said woven layer.

40. The laminate bamboo sporting implement of claim 34, wherein all bamboo layers are treated with a hydrogen peroxide solution to remove impurities and excess moisture, thereby reducing the weight and maintaining the strength of all said bamboo layers.

* * * * *